(12) United States Patent
Hisada (10) Patent No.: US 6,791,719 B1
(45) Date of Patent: Sep. 14, 2004

(54) IMAGE RECORDING APPARATUS AND IMAGE READING APPARATUS CONNECTABLE TO THE IMAGE RECORDING APPARATUS

(75) Inventor: Hidenori Hisada, Tokoname (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/212,715

(22) Filed: Dec. 16, 1998

(30) Foreign Application Priority Data

Dec. 17, 1997 (JP) ............................................ 9-348058

(51) Int. Cl.⁷ ................................................ H04N 7/04
(52) U.S. Cl. ........................ 358/473; 358/474; 358/400
(58) Field of Search ................................. 358/473, 442, 358/443, 444, 468, 400, 401, 407, 474

(56) References Cited

U.S. PATENT DOCUMENTS

| 4,626,925 A | * | 12/1986 | Toyoda ......................... 358/285 |
| 4,962,526 A | * | 10/1990 | Kotani et al. ............ 379/100.02 |
| 4,989,039 A | * | 1/1991 | Hayashi et al. ................ 399/44 |
| 5,497,245 A | * | 3/1996 | Uchida ......................... 358/406 |
| 5,574,859 A | * | 11/1996 | Yeh ............................. 395/831 |
| 5,930,004 A | * | 7/1999 | Imai ............................ 358/422 |
| 6,104,508 A | * | 8/2000 | Miyazaki ..................... 358/474 |
| 6,115,543 A | * | 9/2000 | Murata ........................ 395/102 |

FOREIGN PATENT DOCUMENTS

| JP | A-61-164368 | 7/1986 | ............ H04N/1/04 |
| JP | A-3-267862 | 3/1991 | ............ H04N/1/21 |
| JP | A-10-65859 | 3/1998 | .......... H04N/7/100 |
| JP | 2000022903 A | * 1/2002 | .......... H04N/1/107 |

* cited by examiner

*Primary Examiner*—Kimberly Williams
*Assistant Examiner*—Negussie Worku
(74) *Attorney, Agent, or Firm*—Oliff & Berridge, PLC (57) ABSTRACT

Upon depression of a copy execution button 8, an image recording apparatus 1 executes a copy processing by causing an ink jet printer 37 to record the image data read by an image reading part 21 on recording paper. Alternatively, upon depression of the copy execution button 8, the image recording apparatus 1 causes the ink jet printer 37 to record the image data transmitted from a hand-scanner 2 through a transmission cable K1 connecting the image recording apparatus 1 and the hand-scanner 2 which is capable of reading image information on an original.

20 Claims, 5 Drawing Sheets

IMAGE RECORDING APPARATUS AND IMAGE READING APPARATUS CONNECTABLE TO THE IMAGE RECORDING APPARATUS

BACKGROUND OF THE INVENTION

1. Field of the Invention

The present invention relates to an image recording apparatus in which a recording part records image data based on image information transmitted through a transmission cable on a recording medium and an image reading apparatus which is connectable to the image recording apparatus. More particularly, it relates to an image recording apparatus in which a recording part of the recording apparatus provided with various functions such as a copy function, a printer function can record image data when the image recording apparatus receives the image information read by an image reading apparatus and transmitted through a transmission cable, and the image reading apparatus which can be connected to the image recording apparatus.

2. Description of Related Art

Heretofore, there have been proposed many image recording apparatus called a multi-function-device provided with various functions such as a reading function, a copy function, a facsimile function, a printer function, or the like so that respective functions are carried out in one machine.

Figure 5:
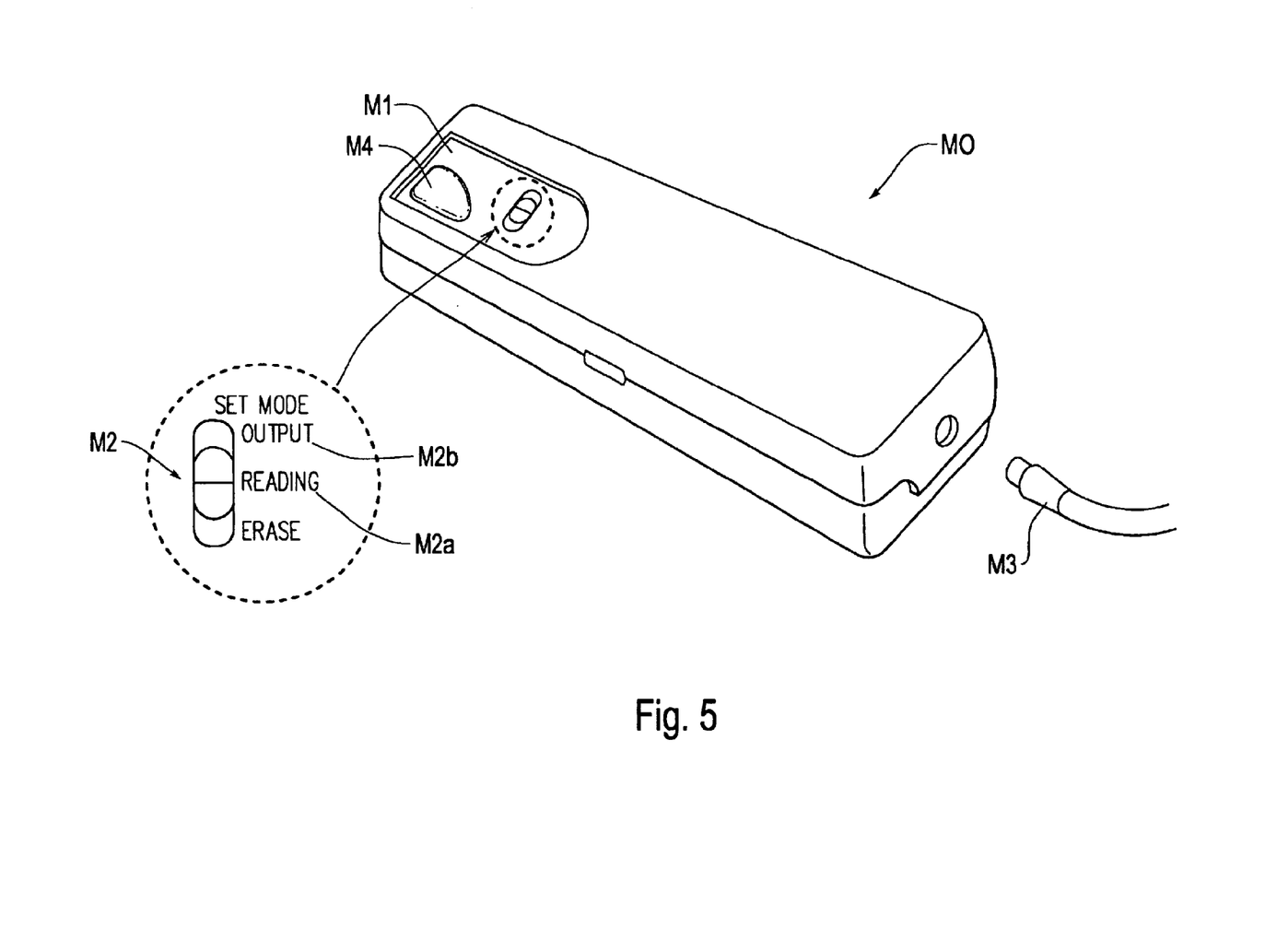
FIG. 5 is a perspective view of a conventional hand-scanner and a part of a control panel thereof.

One of the image recording apparatus is arranged so that a hand-held type reading device constituted separately from the apparatus can be connected thereto through a cable. The reading device is generally called hand-scanner, one example of which is shown in FIG. 5. This hand-scanner M0 easily reads image on bound documents including magazines, notebooks, books or the like, and transmits the image information through a hand-scanner cable M3 to the image recording apparatus. This apparatus when receives the image information can print out the image data based on the image information on a recording paper or transmit the same by facsimile.

However, the reading device M0 shown in FIG. 5 should be operated in the following manner. A switch M2 for setting a mode, provided on a control panel M1 of the reading device M0, is slid to a predetermined position for a reading mode M2a, and then a start/stop button M4 provided on the side of the switch M2 is pressed. The reading device M0 in such the state is allowed to scan the original document to read the image information thereon. Subsequently, the reading device M0 is connected to the image recording apparatus through the cable M3. The switch M2 is then slid to a position for an output mode M2b from the reading mode position M2a and the start/stop button M4 is depressed to print out the image data on recording paper. In this way, the conventional reading device M0 requires the above troublesome operations.

SUMMARY OF THE INVENTION

The present invention has been made in view of the above circumstances and has an object to overcome the above problems and to provide an image recording apparatus capable of simplifying the operational processes to allow a recording part of the apparatus that receives the image information through a transmission cable to record the image data based on the image information on a recording medium and an image reading apparatus connectable to the image recording apparatus.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided an image recording apparatus including a main body, a connecting part, disposed on the main body, for connecting the image recording apparatus to an external image reading apparatus which is capable of reading image information on a first original, the read image information being transmitted to the image recording apparatus from the external image reading apparatus, an operating section operative in response to manual operation, and a recording section for recording, onto a recording medium, image data based upon the read image information transmitted from the external image reading apparatus in response to the manual operation.

The above image recording apparatus, in response to the manual operation of the operating section, receives the image information from image reading apparatus and records the image data based on the image information onto the recording medium. Accordingly, the image recording apparatus of the present invention can simplify the operational processes without needing the troublesome operation needed in the conventional reading device. If only the image recording apparatus alone is operated, the image information stored in the image reading apparatus can be recorded on the recording medium. This can improve the operability of the image recording apparatus.

According to another aspect of the present invention, there is provided an image reading apparatus including a reading part for reading image information on an original, and a connecting part for connecting the image reading apparatus to an external image recording apparatus, the external image recording apparatus being capable of recording image data based on the image information read by the reading part of the image reading apparatus on a recording medium and the external image recording apparatus including an operating section operative to manual operation, and a control device for transmitting the image information read by the reading part to the external image recording apparatus in response to the manual operation of the operating section of the image recording apparatus.

In the above image reading apparatus, upon the manual operation of the operating section of the external image recording apparatus, the control device of the image reading apparatus can transmit the read image information to the image recording apparatus. Accordingly, the troublesome operation needed for the conventional reading apparatus M0 shown in FIG. 5 is unnecessary. This can make it easy to operate the image reading apparatus.

According to a third aspect of the present invention, there is provided an image input and output apparatus including an image reading apparatus for reading image information on a first original, an image recording apparatus having an operating section operative in response to manual operation and a recording section for recording the image information on a recording medium, a transmission cable for connecting the image reading apparatus with the image recording apparatus, and a control device for causing the recording section of the image recording apparatus to record the image data based on the image information transmitted from the image reading apparatus through the transmission cable in response to the manual operation of the operating section of the image recording apparatus.

In the above image input and output apparatus, in response to the manual operation of the operating section of the image recording apparatus, the recording section of the image recording apparatus records the image information transmitted from the image reading apparatus through the transmission cable connecting the image recording apparatus with the image reading apparatus, on the recording medium. Accordingly, the image input and output apparatus of the present invention can simplify its operation without needing the troublesome operation needed in the conventional reading apparatus M0 shown in FIG. 5. Furthermore, if only the image recording apparatus alone is operated, the image information stored in the image reading apparatus can be recorded on a recording medium, thus improving the operability.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of one preferred embodiment of an image recording apparatus and an image reading apparatus connectable to the image recording apparatus embodying the present invention will now be given referring to the accompanying drawings.

Figure 1:
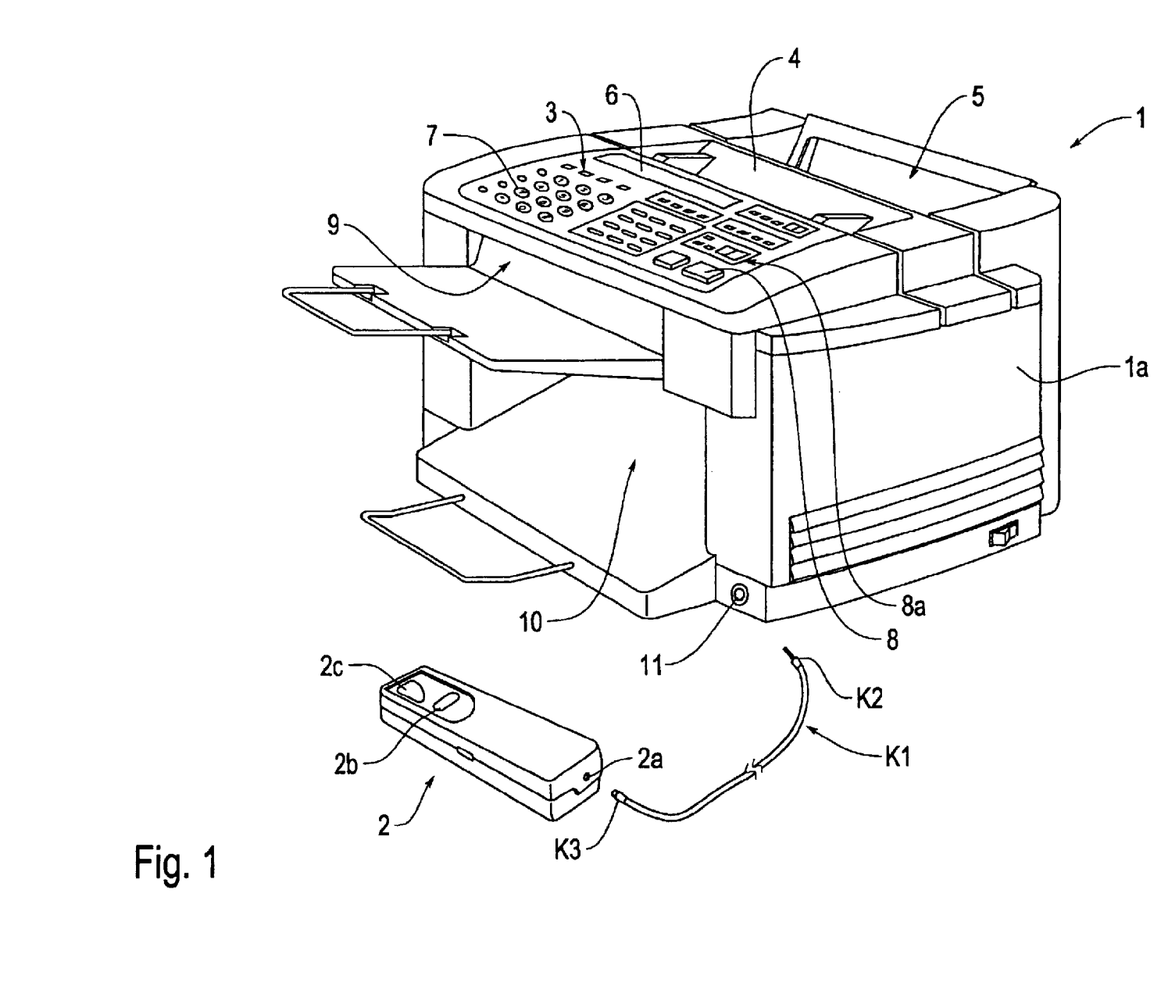
FIG. 1 is a perspective view of an image recording apparatus and an image reading apparatus in an embodiment according to the present invention.

A schematic construction of the image recording apparatus in the present embodiment is described below with reference to FIG. 1. FIG. 1 is a perspective view of the image recording apparatus and the image reading apparatus connectable to the image recording apparatus.

The image recording apparatus 1 has various functions such as a reading function, a facsimile function, a copy function, a printer function, a telephone function and others. In addition, the apparatus 1 is connectable with a hand-held type scanner (referred to as a hand-scanner hereinafter) 2 through a transmission cable K1. The hand-scanner 2 is an image reading apparatus constructed separately from the image recording apparatus 1.

In FIG. 1, the image recording apparatus 1 is provided with a main body 1a. On an upper surface of the main body 1a, a control panel 3 provided with various buttons put in order is disposed on a front side and an original document (which is a second original in claims of the invention) set tray 4 for setting original documents to be read is disposed at a center. On a rear side of the upper surface of the main body 1a, disposed is a cassette insertion part 5 in which a sheet cassette (not shown) for holding stacked recording sheets of paper as a recording medium.

The control panel 3 includes thereon a liquid crystal display (LCD) 6 for displaying various messages, for example, a telephone number when the facsimile function is executed, an operation command message to print the image data based on the image information read by the hand-scanner 2, and other messages needed for a copy function and other functions.

Buttons 7 provided with numerals "0" to "0" respectively are disposed on a lower side (the left side in FIG. 1) of the LCD 6. Those numeral buttons 7 are used for inputting a telephone number to execute the facsimile function, the number of sheets to be copied at the time of execution of the copy function, and the like.

A copy execution button 8 serving as an operating section is disposed on a right lower side on the control panel 3. This button 8 is depressed to execute the copy function and the printing function for printing the image data based on the image information read by the hand-scanner 2. It is to be noted that the detailed description of the copy execution button 8 will be mentioned later.

The original document tray 4 is a part for holding original documents to be sent to the opposite party by facsimile transmission and original documents to be copied. The original document put on the tray 4 is fed to the inside of the main body 1a, while the image information on the document is read as image data by an image reading part 21 (see FIG. 2). Subsequently, the original document is discharged to a sent document tray 9 provided on a front side of the main body 1a. The image data read through the image reading part 21 is recorded by an ink jet printer 37 (see FIG. 2) on a recording sheet supplied from the sheet cassette inserted in the cassette insertion part 5. The recording sheet on which the image data has been recorded is then discharged onto a recorded sheet outlet tray 10 disposed below the sent document tray 9.

The original document set tray 4 is provided with a sensor 38 (see FIG. 2) which is a first detecting device for detecting whether or not an original document exists on the set tray 4. This original document sensor 38 is constructed of, for example, a photo-interrupter and a photo-coupler. The photo-interrupter is caused to rotate by the leading end of an original document. The sensor can detects the presence or absence of an original document by detecting light-shield or light-transmission by the photo-coupler.

Furthermore, on a lower right of the front surface of the main body 1a is disposed an input terminal 11 serving as a connecting part in which an end K2 of the transmission cable K1 for the hand-scanner 2 is inserted. When the hand-scanner 2 is connected to the apparatus 1 through the cable K1 with the end K2 inserted in the input terminal 11 and with the other end K3 inserted in an insert port 2a of the hand-scanner 2, the apparatus 1 captures the image information from a RAM 46 (see FIG. 2) of the hand-scanner 2.

Figure 3:
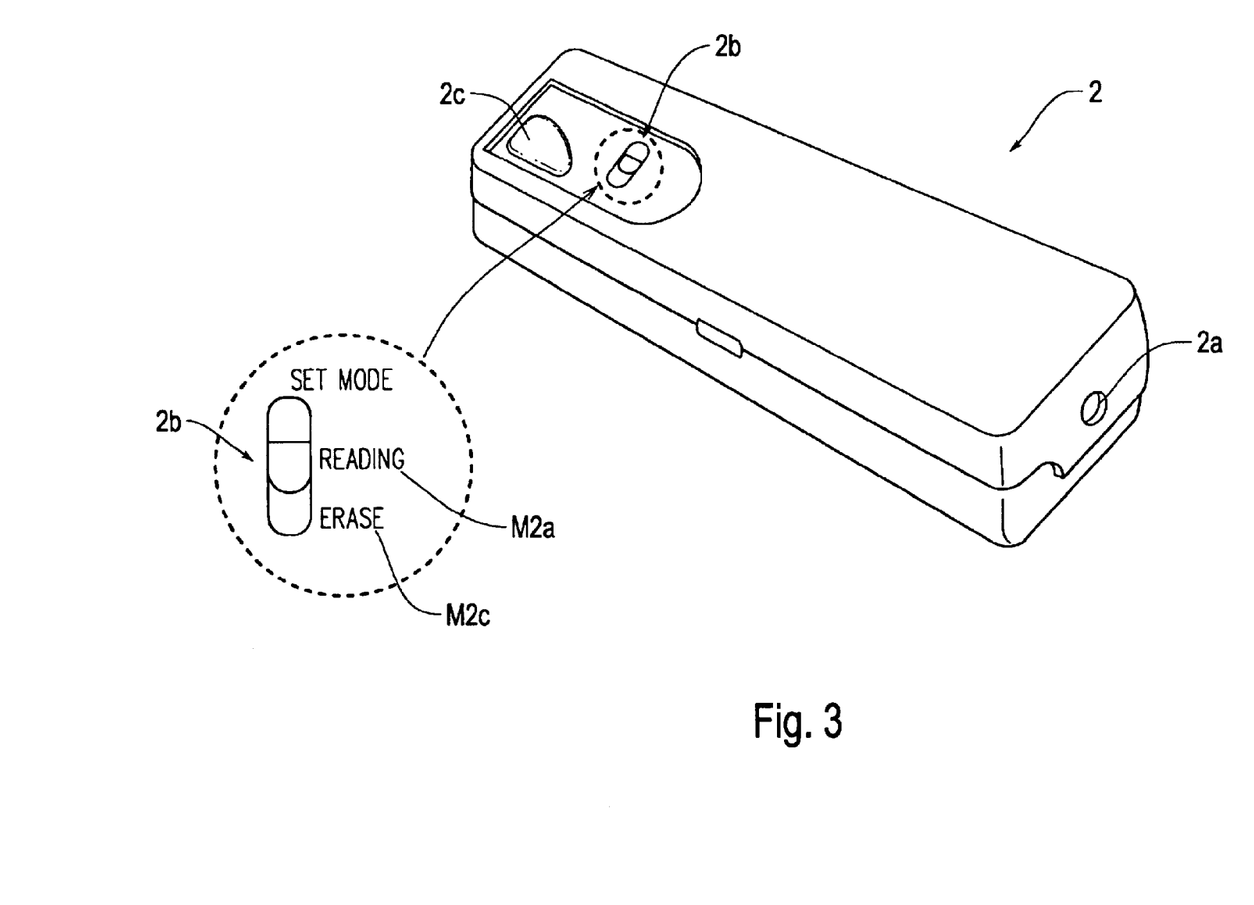
FIG. 3 is a perspective view of the image reading apparatus and an enlarged view of a part of a control panel thereof.

The hand-scanner 2 is constructed to read the image information of bound documents such as magazines, notebooks, books or the like while scanning the document at a constant speed by operation of a user. In this embodiment, the hand-scanner 2 is provided on its upper surface with an operation switch 2b and a start/stop button 2c disposed on the side of the operation switch 2b as shown in FIG. 3. When the operation switch 2b is shifted to a position M2a for a reading mode and the start/stop button 2c is depressed, the hand-scanner 2 can read the image information of the bound document while scanning it. It is to be noted that the image information stored in the RAM 64 of the hand-scanner 2 can be erased when the operation switch 2b is shifted to another position M2c for an erasing mode.

Figure 2:
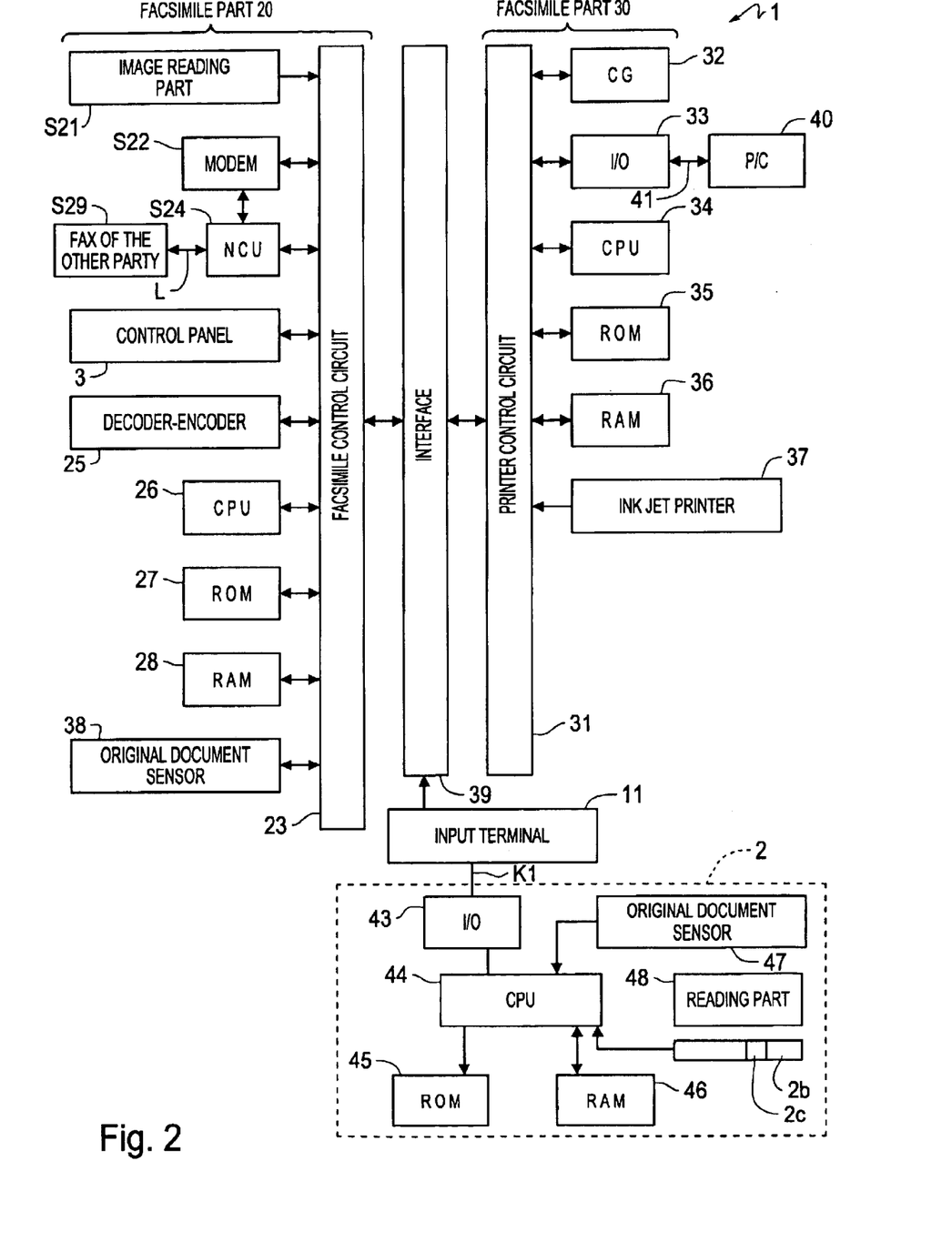
FIG. 2 is a block diagram of a control system of the image recording apparatus and the image reading apparatus.

Next, the control system of the image recording apparatus 1 constructed as above will be described with reference to FIG. 2 FIG. 2 is a block diagram of the control system of the image recording apparatus 1 and the hand-scanner 2. In FIG. 2, the apparatus 1 is mainly constructed of a facsimile section 20 and a printer section 30. The facsimile section 20 and the printer section 30 can transmit signals or data to each other through an interface 30.

The facsimile section 20 includes a facsimile control circuit 23, an image reading part 21, a modem 22, a network control unit (NCU) 24, a decoder-encoder 25, a CPU 26 serving as a control device, a ROM 27, a RAM 28 and others. The facsimile control circuit 23 controls the image reading part 21 for reading the image information of original documents, whereby to execute facsimile transmission. The modem 22 transmits/receives the image date to/from a facsimile machine 29 on the opposite end of the line through a network such as the NCU 24, a telephone line L, or the like. The NCU 24 is a unit for transmitting dial signals to the telephone network or responding to a call signal from the telephone network. The decoder-encoder 25 encodes the image data read by the image reading part 21 or the hand-scanner 2 to transmit it to the facsimile 29 or decoding the encoded data transmitted from the facsimile 29 to record it.

The ROM 27 is a memory for storing an execution program (referred to as a selection execution program hereinafter) to select the copy function or the printing function for printing the image data read by the hand-scanner 2, and other various programs needed for the control of the facsimile section 20. The RAM 28 is a memory for temporarily storing the received data from the facsimile 29 on the opposite end of the line, the image data read by the image reading part 21, and various data calculated through the CPU 26.

The CPU 26 controls selectively the copy function or the print function for printing the image data read by the hand-scanner 2 in response to the selection execution program stored in the ROM 27, or controls the entire facsimile section 20 in response to the programs needed for carrying out other various functions of the facsimile section, stored in the ROM 27. Noted that the facsimile control circuit 23 is connected with the control panel 3 and the original document sensor 38.

The printer section 30 includes a printer control circuit 31, a character generating circuit (CG) 32, an input-output circuit (I/O) 33, a CPU 34, a ROM 35, a RAM 36, an ink jet printer 37. It is to be noted that the copy function is executed by the facsimile section 20 in cooperation with the printer section 30.

Specifically, the printer control circuit 31 controls the ink jet printer 37 to perform the print function. The character generating circuit 32 is a circuit for converting the code data transmitted from a personal computer 40 into the image data to be recorded on a recording paper. For example, if the code data included in transmission data is "A", the code data "A" is converted into the image data so that the image "A" is recorded on recording paper. The input-output circuit 33 transmits/receives transmission data to/from the personal computer (P/C) 40 through a cable 41. The CPU 34 controls the printer section 30 in response to the printer control program stored in the ROM 35. The data calculated during the control of the printer section is temporarily stored in the RAM 36. The RAM 36 also stores the data transmitted from the personal computer 40 or the image data transmitted from the hand-scanner 2. The ink jet printer 37 is used for recording characters and the like by selectively ejecting ink droplets through ink orifices formed in an ink jet head onto recording paper.

The input terminal 11 connected to the interface 39 is used for transmitting the image data from the hand-scanner 2 to the apparatus 1 as mentioned above. When the end K2 of the transmission cable K1 is inserted in the input terminal 11 and the opposite end K3 of the cable K1 is inserted in the insert port 2a of the hand-scanner 2, the CPU 26 detects a signal from the input terminal 11 which is a second detection device, whereby to recognize the connection with the hand-scanner 2.

The hand-scanner 2 includes, besides the switches 2b and 2c, an input/output (I/O) circuit 43, a CPU 44 which is a control device, a ROM 45, a RAM 46 as a memory (e.g., a nonvolatile memory), an encoder 47, a reading part 48, and others. When the reading part 48 reads the image information on an original document (which is a first original in claims of the invention), a synchronizing signal is inputted from the encoder 47. The reading part 48 thus can clearly read the image information even if the hand-scanner 2 is manually moved on the original document by the user to scan the document.

When the CPU 44 operates in accordance with the program stored in the ROM 45, it can transmits the image information stored in the RAM 46 to the image recording apparatus 1, e.g., through the I/O circuit 43. Specifically, in the state where the hand-scanner 2 and the apparatus 1 are connected to each other through the transmission cable K1, the copy execution button 8 of the apparatus 1 is depressed, whereby the CPU 44 receives the command signal transmitted from the CPU 26 through the facsimile control circuit 23, the interface 39, the input terminal 11, the cable K1 and the I/O circuit 43. Even when the operational switch 2b is set to the position M2a for a reading mode, the CPU 44 having received the signal can transmit the image data read by the reading part 48 to the CPU 34 through the I/O circuit 43, the cable K1, the input terminal 11, the interface 39, and the printer control, circuit 31, or to the CPU 26 through the I/O circuit 43, the cable K1, the input terminal 11, the interface 39, and the facsimile control circuit 23.

Accordingly, the CPU 34 can store the image data transmitted from the hand-scanner 2 through the transmission cable K1 and cause the ink jet printer 37 of the apparatus 1 to record the data on recording paper. That is, the image data read by the hand-scanner 2 can be captured in the image recording apparatus 1 upon depression of the copy execution button 8. This can save the work of sliding the mode setting switch M2 shown in FIG. 5 from the reading mode position M2a to the output mode position M2b, so that the operational processes can be simplified. The switch M2 shown in FIG. 5 needs three positions; M2b for "OUTPUT", M2a for "READ", and M2c for "DELETE". On the other hand, the switch 2b shown in FIG. 3 needs only two positions; M2a for "READ" and M2c for "DELETE", and thus an inexpensive switch can be used in the present embodiment.

In the case of the conventional switch having three positions for "OUTPUT", "READ" and "DELETE", there is a possibility that the user operates the switch M2 in error such that the reading mode may be changed to the erasing mode in spite of user's intention of changing the mode to the output mode. As a result thereof, the image data read by the hand-scanner 2 may be erased readily. According to the present embodiment, however, no switching operation of the switch is needed after the image data is read, thus preventing the above erroneous operation.

Figure 4:
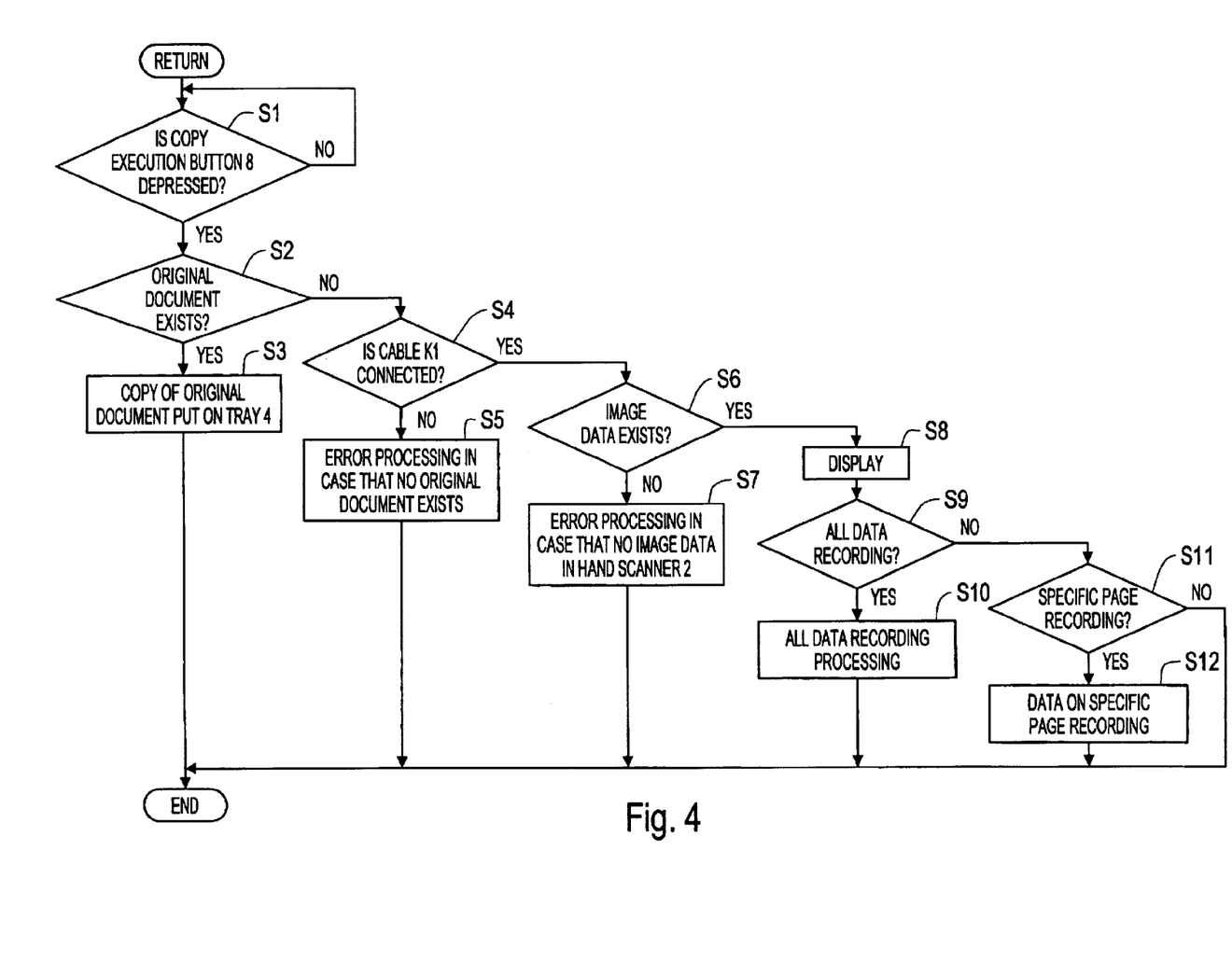
FIG. 4 is a flowchart of a program for operation of the image recording apparatus.

Next, the selection execution program to be performed in the image recording apparatus 1 and the hand-scanner 2 constructed as above is explained with reference to FIG. 4. FIG. 4 is a flow chart of the program.

In FIG. 4, the judgement is made in step (referred to as "S" hereinafter) 1 as to whether or not the copy execution button 8 is depressed. If the button 8 is not depressed (S1: NO), the CPU 26 waits until the button 8 is depressed. If the button 8 is depressed (S1: YES), the next judgement is made as to whether an original document exists on the original document set tray 4 (S2). This detection is made based on whether or not the document sensor 38 outputs a detection signal. If an original document exists (S2: YES), the copy function is executed (S3). Specifically, the document set on the tray 4 is fed toward the sent document tray 9 while the image data thereof is read by the image reading part 21. The read image data is transmitted from the facsimile section 20 to the printer section 30. The ink jet printer 37 is caused to record the image data on recording paper fed from the sheet cassette, thus performing a copying operation.

Upon completion of the copying operation, the recorded paper is discharged to the outlet tray 10. It is to be noted that the CPUs 26 and 34 execute a copy processing in S3. When the document sensor 38 (the first detection device) detects the original document, even if the image recording apparatus 1 and the hand-scanner 2 are connected through the transmission cable K1, the copying mode is given priority. In the copying mode, the image reading part 21 reads the image information on the document and the ink jet printer 37 records the image data on the recording paper. Thus, even when both apparatus are left as connected with each other through the transmission cable K1, the copying operation can be executed if the user puts the original document(s) on the document set tray 4. The apparatus is therefore easy to handle.

When it is judged in S2 that no original document exits (S2: NO), the judgement is made as to whether the transmission cable K1 is connected between the apparatus 1 and the hand-scanner 2 (S4). In the case of "NO" in S4, that is, if the copy execution button 8 is depressed when no original document exists in the document tray 4 and the transmission cable K1 is not connected between the apparatus 1 and the hand-scanner 2, an error processing is performed (S5). In this processing, a message, for example, "NO DOCUMENT EXISTS ON DOCUMENT TRAY" is displayed on the LCD 6, whereby the user can easily recognize that his/her operation was wrong. The CPU 26 executes an error processing in S5 in the present invention.

If "YES" in 54, the judgement is made as to whether the image data is stored in the RAM 46 of the hand-scanner 2 (S6). If "NO" in S6, that is, it is judged that the image data does not exist in the RAM 46, the ink jet printer 37 is not allowed to record the image data on recording paper, and the error processing is performed (S7). In this error processing, a message, for example, "NO IMAGE DATA EXISTS IN HAND-SCANNER" is displayed on the LCD 6. Accordingly, the user can easily recognize that his/her using manner of the apparatus was wrong. The CPU 26 executes judgement and error processing in S6 and S7 respectively in the present invention.

If "YES" in S6, that is, it is judged that the image data exists in the RAM 46, a message to the effect is displayed on the LCD 6 (S8). Subsequently, whether all the image data stored in the RAM 46 should be recorded is judged (S9).

In this case, the depression of arrow keys 8a ("→" and "←" keys) provided on the control panel 3 allows the LCD 6 to change in turn displayed massages such as "SPECIFIC PAGE RECORDING", "ALL PAGES RECORDING", etc. When the user depresses the copy execution button 8 again upon display of the message "ALL PAGES RECORDING" (S9: YES), all the image data stored in the RAM 46 is recorded on the recording paper. Specifically, all the image data from the RAM 46 is transmitted to the CPU 34 of the printer section through the I/O circuit 43, the interface 39, the printer control circuit 31. Therefore, under the control of the CPU 34, the RAM 36 stores the image data and the ink jet printer 37 records all the image data on the recording paper sheet fed from the sheet cassette (S10).

If "NO" in S9, a determination is made as to whether or not the image data of a specific page stored in the RAM 46 is recorded on a recording sheet (S11). When the arrow keys 8a ("→" and "←" keys) on the control panel 3 are depressed, the displayed message on the LCD 6 is changed to "SPECIFIC PAGE RECORDING", "ALL PAGES RECORDING", in turn. When the user depresses the buttons 8 again upon display of the message "SPECIFIC PAGE RECORDING" (S11: YES), the image data of the specific page is recorded on the recording sheet (S12).

In this case, the image data of the specific page is transmitted from the RAM 46 to the printer section 30 through the I/O circuit 43 and the interface 39. The ink jet printer 37 records the image data on the recording sheet fed from the sheet cassette. If "NO" in S11, alternatively, the process is completed there.

For the case that an original document exists in the document set tray 4, it is conceivable that the facsimile transmission is executed. In this case, the LCD 6 may be arranged to alternately display the copy function message mentioned above and the facsimile transmission message (for example, a message of requesting the user to input a facsimile number) at predetermined intervals.

As mentioned above in detail, according to the image recording apparatus in the present embodiment, the apparatus 1 records the image data on recording paper (a recording medium) through the ink jet printer 37 upon depression of the copy execution button 8. The apparatus 1 is provided with the input terminal 11 which is connectable to the hand-scanner 2 through the transmission cable K1 and the CPU 34 which causes the ink jet printer 37 to record the image data transmitted from the hand-scanner 2 through the cable K1 on the recording paper upon the depression of the copy execution button 8 in the state where the hand-scanner 2 and the apparatus 1 with the input terminal 11 are connected through the cable K1.

When the button 8 is depressed in the state where the hand-scanner 2 and the apparatus 1 are connected through the cable K1, the ink jet printer 37 cf the apparatus 1 is caused to record the image data transmitted from the hand-scanner 2 through the cable K1. In this constitution, the recording process is also executed by the depression of the copy execution button 8 in the same manner as in the normal copying operation. The operation can be simplified accordingly.

According to the image reading apparatus in the present embodiment, the hand-scanner 2 can be connected to the image recording apparatus 1 through the transmission cable K1. The hand-scanner 2 is provided with the reading part 48 which can read the image information on the original document. The hand-scanner 2 also includes the CPU 44 which transmits the image data read by the reading part 48 to the apparatus 1 through the cable K1 connecting the apparatus 1 with the hand-scanner 2 in response to the depression of the copy execution button 8 of the apparatus 1.

When the button 8 is depressed under the condition that the apparatus 1 and the hand-scanner 2 are connected to each other through the cable K1, the CPU 44 of the hand-scanner 2 can transmit the image data to the apparatus 1 through the cable K1. Accordingly, the apparatus 1 can perform the recording of the image data on the recording paper by use of the ink jet printer 37 or the facsimile transmission.

The present invention may be embodied in other specific forms without departing from the spirit or essential characteristics thereof. For instance, the image reading apparatus is not limited to the hand-scanner 2. The operating section is preferably the copy execution button 8 and may by other keys or switches. The recording part may be a thermal head and the like instead of the ink jet printer 37. The recording medium may be any medium other than normal recording paper sheets.

In the above embodiment, the apparatus is arranged such that, after the depression of the copy execution button 8 is detected, the existence or absence of original document is detected. This gives priority to the copying operation. However, it may be arranged such that the connecting state of the transmission cable K1 is first detected in S4 to give priority to the recording of the image data from the hand-scanner 2.

It may be constructed such that the image data read by the hand-scanner 2 is transmitted to the CPU 26 in response to the depression of a predetermined key on the control panel 3 and is stored in the RAM 28 to transmit to the facsimile machine 29 in the opposite end.

It is to be noted that the image recording apparatus and the hand-scanner serving as the image reading apparatus, which are separately constructed in the above embodiment, may be combined to provide an image input and output apparatus.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed:

1. An image recording apparatus including:
   a main body;
   a connecting part, disposed on the main body, for detachably connecting the image recording apparatus to an external image reading apparatus with a first reading part which is capable of reading image information on a first original by the first reading part, the read image information being transmitted to the image recording apparatus from the external image reading apparatus;
   a switch button arranged in an operating panel provided on the main body, operative in response to manual operation; and
   a recording section for recording, onto a recording medium, image data based upon the read image information transmitted from the external image reading apparatus in response to the manual operation of the switch button when the external image reading apparatus is connected to the connecting part;
   a second reading part provided on the main body, for reading image information on a second original set on the main body; and
   a first detection device for detecting whether or not the second original to be read by the second reading part is set on the main body;
   wherein when the switch button is manually operated and the first detection device detects that the second original is set on the main body, the second reading part preferentially reads the image information on the second original even if the external image reading apparatus is connected to the connecting part of the image recording apparatus and then the recording section records, onto the recording medium, image data on the basis of the image information read by the second reading part.

2. The image recording apparatus according to claim 1 further comprising:
   a control device for outputting a command signal to the external image reading apparatus in response to the manual operation of the switch button, the command signal instructing the external image reading apparatus to transmit the read image information to the image recording apparatus.

3. The image recording apparatus according to claim 1, further including:
   a transmission cable connecting the image recording apparatus with the external image reading apparatus, the image information read by the external image reading apparatus being transmitted from the external image reading apparatus to the image recording apparatus through the transmission cable;
   wherein the external image reading apparatus includes a memory for storing the read image information.

4. The image recording apparatus according to claim 3 further including:
   a second detection device for detecting whether or not the transmission cable is connected between the image recording apparatus and the external image reading apparatus;
   wherein when the switch button is manually operated and the first detection device detects that no second original exists on the main body and the second detection device detects that no transmission cable is connected between the image recording apparatus and the external image reading apparatus, the control device executes an error processing.

5. The image recording apparatus according to claim 3 further including:
   a second detection device for detecting whether or not the transmission cable is connected between the image recording apparatus and the external image reading apparatus; and
   a third detection device for detecting whether or not the image information is stored in the memory of the external image reading apparatus;
   wherein when the switch button is manually operated and the first detection device detects that no second original exists on the main body and the second detection device detects that the transmission cable is connected between the image recording apparatus and the external image reading apparatus and the third detection device detects that the image information is stored in the memory, the recording section records, onto the recording medium, the image data based upon the image information transmitted from the external image reading apparatus.

6. The image recording apparatus according to claim 3 further including:
a second detection device for detecting whether or not the transmission cable is connected between the image recording apparatus and the external image reading apparatus; and
a third detection device for detecting whether or not the image information is stored in the memory of the external image reading apparatus;
wherein when the switch button is manually operated and the first detection device detects that no second original exists on the main body and the second detection device detects that the transmission cable is connected between the image recording apparatus and the external image reading apparatus and the third detection device detects that no image information is stored in the memory, the control device executes an error processing.

7. The image recording apparatus according to claim 3 further including:
a second detection device for detecting whether or not the transmission cable is connected between the image recording apparatus and the external image reading apparatus;
a third detection device for detecting whether or not the image information is stored in the memory of the external image reading apparatus; and
a fourth detection device for determining, when the first original comprises a plurality of pages, whether or not only the image data based upon the read image information on a specific page is recorded on the recording medium;
wherein when the switch button is manually operated and the first detection device detects that no second original exists on the main body and the second detection device detects that the transmission cable is connected between the image recording apparatus and the external image reading apparatus and the third detection device detects that the image information is stored in the memory and the fourth detection device determines that only the image data based upon the read image information on the specific page is recorded on the recording medium, the recording section records, onto the recording medium, the image data based upon the read image information on the specific page.

8. The image recording apparatus according to claim 3, wherein the eternal image reading device is a hand-scanner provided with an operating switch for selecting one of a reading mode for reading the image information on the first original and an erasing mode for erasing mode for erasing the image information stored in the memory.

9. An image reading apparatus including:
a first reading part for reading image information on a first original; and
a connecting part for detachably connecting the image reading apparatus to an external image recording apparatus, the external image recording apparatus being capable of recording data of the image information read by the first reading part of the image reading apparatus on a recording medium and the external image recording apparatus including:
a switch button arranged in an operating panel on a main body, operative to manual operation, a second reading part provided on the main body, for reading image information on a second original set on the main body and a first detection device for detecting whether or not the second original to be read by the second reading part is set on the main body; and
a control device for transmitting the image information read by the first reading part to the external image recording apparatus in response to the manual operation of the switch button of the image recording apparatus when the external image recording apparatus is connected to the connecting part;
wherein when the switch button is manually operated and the first detection device detects that the second original is set on the main body, the second reading part preferentially reads the image information on the second original even if the image recording apparatus is connected to the connecting part of the image reading apparatus and then the external recording apparatus records, onto the recording medium, image data on the basis of the image information read by the second reading part.

10. The image reading apparatus according to claim 9 further including:
a memory for storing the read image information;
wherein the image reading apparatus is a hand-scanner provided with an operating switch for selecting one of a reading mode for reading the image information on the first original and an erasing mode for erasing the image information stored in the memory.

11. The image reading apparatus according to claim 9, wherein the image reading apparatus receives a command signal from the external image recording apparatus in response to the manual operation of the switch button, the command signal instructing the image reading apparatus to transmit the read image information to the external image recording apparatus.

12. The image reading apparatus according to claim 9, wherein the switch button is a copy execution button provided on the operating panel of the image recording apparatus.

13. An image input and output apparatus including:
an image reading apparatus with a first reading part for reading image information on a first original;
an image recording apparatus having:
a switch button arranged in an operating panel provided on a main body, operative in response to manual operation;
a recording section for recording the image information on a recording medium;
a second reading part provided on the main body, for reading image information on a second original set on the main body;
a first detection device for detecting whether or not the second original to be read by the second reading part is set on the main body;
a transmission cable for detachably connecting the image reading apparatus with the image recording apparatus; and
a control device for causing the recording section of the image recording apparatus to record the image data based on the image information transmitted from the image reading apparatus through the transmission cable in response to the manual operation of the switch button of the image recording apparatus when the image reading apparatus and the image recording apparatus are connected to each other through the transmission cable; wherein when the switch button is manually operated and the first detection device detects that the second original is set on the main body, the second reading part preferentially reads the image information on the second original even if the image reading apparatus and the image recording apparatus are connected through the transmission cable and then the recording section records, onto the recording medium, image data on the basis of the image information read by the second reading part.

14. The image input and output apparatus according to claim 13, wherein the image recording apparatus transmits a command signal to the image reading apparatus, the command signal instructing the image reading apparatus to output the image information read by the image reading apparatus.

15. The image input and output apparatus according to claim 13, wherein the image reading apparatus is a hand-scanner which is capable of reading image information on the first original.

16. An image recording apparatus including:
   a main body;
   a connecting part disposed on the main body and detachably connectable to an external image reading apparatus capable of reading image information;
   an operating section provided on the main body, operative in response to manual operation; and
   a judging section for judging whether or not the external image reading apparatus is attached to the connecting part; and
   a control section which changes functions of the main body between controlling a first reading part of the external reading apparatus and controlling a second reading part provided on the main body based on a judgment result by the judging section in response to a common manual operation of the operating section.

17. The image recording apparatus according to claim 16 further including a detecting section for detecting whether or not the external image reading apparatus has stored the read image information,
   wherein, when the judging section judges that the external image reading apparatus is attached to the connecting section, the control section causes the detecting section to detect whether or not the external image reading apparatus has stored the read image information.

18. The image recording apparatus according to claim 16 further including an informing section,
   wherein, when the judging section judges that the external image reading apparatus is unconnected to the connecting part, the control section causes the informing section to inform that the external image reading apparatus is unconnected to the connecting part.

19. The image recording apparatus according to claim 16 further including:
   an original setting section on which an original is set;
   an image reading apparatus internally provided for reading image information from the original placed on the original setting section; and
   an original detecting section for detecting whether or not the original is set on the original setting section;
   wherein, when the original detecting section judges that the original is set on the original setting section, the control section causes the internally provided image reading apparatus to read the image information from the original set on the original setting section in response to the common manual operation of the operating section regardless of the judgment result by the judging section.

20. The image recording apparatus according to claim 16, wherein the external image reading apparatus is detachably attached to the connecting part through a transmission cable.

* * * * *